(12) United States Patent
Pekarski et al.

(10) Patent No.: US 7,714,522 B2
(45) Date of Patent: May 11, 2010

(54) METHOD AND CIRCUIT ARRANGEMENT FOR OPERATING A DISCHARGE LAMP

(75) Inventors: Pavel Pekarski, Eindhoven (DE); Johan Wijntjens, Waarle (NL); Holger Moench, Vaals (NL); Jens Pollmann-Retsch, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 551 days.

(21) Appl. No.: 11/573,014

(22) PCT Filed: Aug. 4, 2005

(86) PCT No.: PCT/IB2005/052604
§ 371 (c)(1),
(2), (4) Date: Jan. 31, 2007

(87) PCT Pub. No.: WO2006/016335
PCT Pub. Date: Jul. 16, 2006

(65) Prior Publication Data
US 2009/0009095 A1    Jan. 8, 2009

(30) Foreign Application Priority Data
Aug. 6, 2004   (EP) ................... 04103803

(51) Int. Cl.
*H01J 11/04* (2006.01)
(52) U.S. Cl. ........................................... 315/326
(58) Field of Classification Search .......... 315/326–341
See application file for complete search history.

(56) References Cited

U.S. PATENT DOCUMENTS

| 4,803,406 | A | 2/1989 | Yasuda et al. |
|---|---|---|---|
| 5,583,396 | A | 12/1996 | Hideaki et al. |
| 5,608,294 | A | 3/1997 | Derra et al. |
| 6,172,468 | B1 | 1/2001 | Hollander |
| 2001/0030515 | A1 | 10/2001 | Huber et al. |
| 2002/0105288 | A1 | 8/2002 | Nakagawa et al. |
| 2004/0000880 | A1 | 1/2004 | Ozasa et al. |

FOREIGN PATENT DOCUMENTS

| DE | 19829600 A1 | 9/1999 |
|---|---|---|
| EP | 1150336 A2 | 10/2001 |
| EP | 1152645 A1 | 11/2001 |
| EP | 1152645 B1 | 11/2001 |
| EP | 1215699 A1 | 6/2002 |
| EP | 1408723 A2 | 4/2004 |

*Primary Examiner*—Douglas W Owens
*Assistant Examiner*—Jianzi Chen
(74) *Attorney, Agent, or Firm*—Thorne & Halajian, LLP

(57) ABSTRACT

A method and a circuit arrangement operate a discharge lamp, such as a high-intensity discharge lamp (HID) or ultra high performance lamps (UHP). The discharge lamp has first and second operating phases with a higher first or a lower second frequency of the lamp's alternating current (AC). The operating phases are activated alternatively at defined intervals and for defined periods of time, in order to achieve a stable arc discharge and only a low burnout or rise in burning voltage of the lamp during its life by configuring certain forms of electrode tips.

19 Claims, 3 Drawing Sheets

METHOD AND CIRCUIT ARRANGEMENT FOR OPERATING A DISCHARGE LAMP

The invention relates to a method and a circuit arrangement for operating a discharge lamp. The method as invented and the circuit arrangement as invented are intended especially for HID [high intensity gas discharge] lamps or UHP [ultra high performance] lamps. The invention further relates to an illumination unit with a discharge lamp and such a circuit arrangement as well as a projection system with a projection display and such an illumination unit.

Lamps of this type can be operated principally on DC as well as on AC. In general, however, operating on AC is preferred, because this prevents fast erosion of the electrodes and the efficiency of the lamps can be raised.

However, the hazard of unstable arc discharges that cause flickering of the emitted light stream also increases, especially when operating on AC, owing to the constant change in polarity. This is mainly due to the fact that the arc discharge depends on the temperature and the state of the surface of the electrodes and, moreover, the time-dependent patterns of the electrode temperature differ in the phases in which the electrodes work as anode and cathode. This, in turn, causes considerable changes in the electrode temperature during a period of the lamp current. In order to have an advantageous impact on these variations, it is known to generate, at the end of each half period of the lamp current i.e. before a change in the polarity, a power pulse with the same polarity as the half period to be changed and to superimpose it on the lamp current such that the total current is increased and the electrode temperature rises. This can improve the stability of the arc discharge considerably.

The effect of these power pulses is that the lamp is operated on a lamp AC that has more or less strongly manifest pulse-like components, which in turn cause a pulse-like enhanced light stream.

Especially in color projection displays that work by time-sequential color reproduction methods, variation in the emitted light stream can distort the appearance, however, if for example one of the ground color images is reproduced with a different brightness than the other ground images.

It is an object of the invention, therefore, to create a method and a circuit arrangement for operating a discharge lamp, by means of which stable arc discharge can be achieved without having to superimpose power pulses on the lamp current for this purpose.

Furthermore, for operating a discharge lamp it should be possible with the invention to provide a method and a circuit arrangement by which method and circuit arrangement the burnout of the electrodes during the life of the lamp and the related rise in burning voltage can at least be considerably reduced or limited.

The object is achieved in accordance with one embodiment including a method for operating a discharge lamp with a first operating phase having a first frequency of the lamp AC and a second operating phase having a second frequency of the lamp AC, where the first frequency is selected such that a thin electrode tip is formed on the electrode body during the operation of the lamp, which tip is melted back by the second frequency at least for the most part and where the second operating phase is activated after a pre-defined period of the first operating phase has elapsed.

With the solutions as invented, a lamp can be operated on a relatively high frequency of the lamp AC (where this frequency can be considerably higher than the frequency of known lamp ACs superimposed with the above mentioned power pulses), such that the advantages related to it, viz. a mostly more stable arc discharge due to the thinner electrode tips as well as lower voltage drop at the electrodes, can be utilized, without having to accept the disadvantages usually related to the high frequencies (foremost being a heavy electrode burnout as well as a comparatively frequent arc jumps or unstable arc discharges owing to the formation of multiple electrode tips). These advantages are achieved without having to superimpose power pulses on the lamp AC in the known manner.

Due to the alternating activation of the two operating phases and especially with a suitable selection of the duration and the repeat frequency of the second operating phase, also the rise in the burning voltage of the lamp during its life can be considerably reduced or limited.

In an embodiment, a switch-on operating phase is activated preferably in lieu of the second operating phase after switching on the lamp, if the lamp is being used not in continuous operation but only for comparatively shorter periods each time.

These and the other aspects of the invention are apparent from and will be elucidated, by way of non-limitative example, with reference to the embodiment(s) described hereinafter.

In the drawings,

FIG. 1 gives a schematic representation of first electrode tips;

FIG. 2 gives a schematic representation of second electrode tips;

Peaks 11, 12; 11a whose growth i.e. length and diameter depends on various operating parameters of the lamp, and which can cause certain desired or undesired properties in the lamp appear on the front mutually facing surfaces of the electrode bodies 10 during the operation of the discharge lamp.

It has been shown that the width or diameter d of a forming electrode tip depends on the frequency f of the lamp AC somewhat like the equation below: $d=c/\sqrt{f[Hz]}$, where the constant c lies between about 2500 and about 4000 μm.

Thus, electrode tips with comparatively small diameters can be generated by using comparatively high operating frequencies f of, for example, between about 300 Hz and about 1000 Hz and tips with a comparatively large diameter by using comparatively low operating frequencies f of, for example, between about 20 to 150 or 200 Hz.

A disadvantage of relatively thick tips as against thin tips is that the heat transport from the free end of the thick tip in the direction of the electrode body 10 is relatively heavy.

With a high-intensity operation of the lamp and the related diffuse arc adhesion at the thick electrode tips, the result is that the voltage drop at the electrodes is very large, the electrode temperature rises steeply and thus the electrode material evaporates on a large scale.

Furthermore, due to the relatively heavy heat transport, especially with relatively low lamp power and the related pointed arc adhesion, the temperature at the free end of a thick tip is lower than in the case of tips with smaller diameters. The result of this is that the danger of arc jumping is considerably higher for thicker tips than for thin tips. Added to this, the maximum amplitude of the arc jumps also rises with increase in the diameter of the electrode tip.

Conversely, in the case of electrodes with a relatively thin tip one can observe a relatively stable arc discharge and a relatively low voltage drop at the electrodes.

Irrespective of the thickness of the electrode tip, however, the result of a relatively high operating frequency f of the lamp AC is generally that especially after a long operating period, a heavier burnout of the electrodes (and thus increase in the burning voltage) can be observed and/or that generally relatively thin peaks form on the electrode between which then the arc jumps here and there.

This is prevented at least to a large extent by using the circuit arrangement as invented and the method as invented so that said advantages of a relatively high operating frequency can be utilized without having to accept disadvantages of it and without having to superimpose the lamp AC with power pulses in the known manner (especially before each change in polarity).

Figure 1:
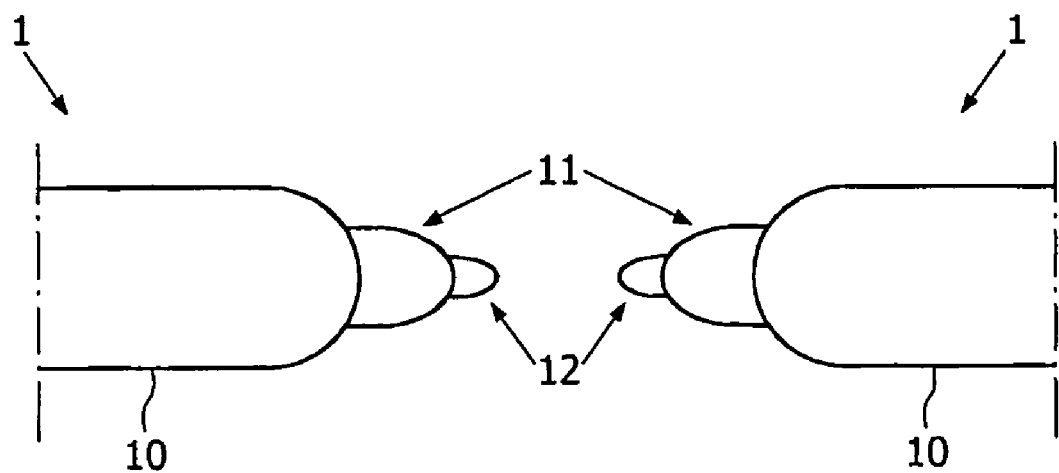
FIGS. 1 and 2 show schematically the mutually facing end areas of two electrodes 1 of a (high-intensity) gas discharge lamp, between which an arc discharge (not shown) forms in the operating state.
Figure 2:
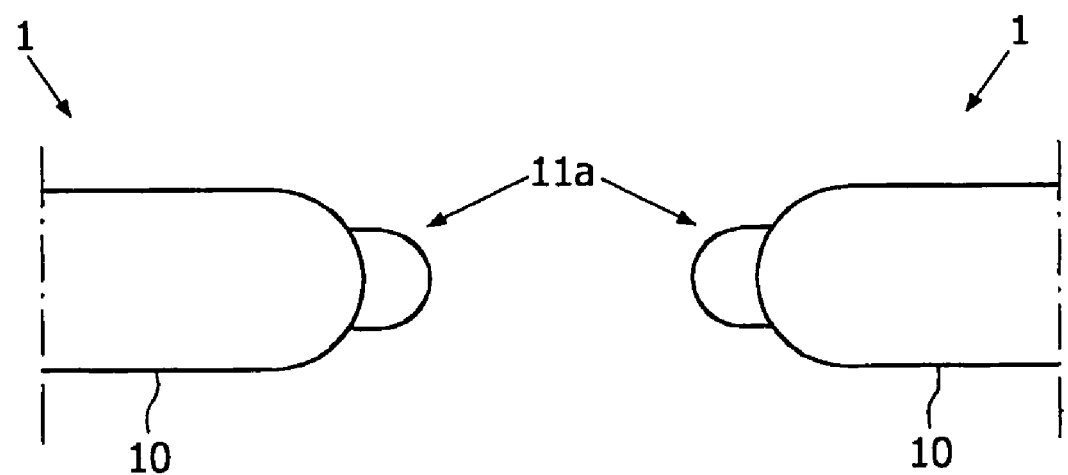

For this purpose, the operating parameters of the lamp, especially the frequency of the lamp AC are set and changed or controlled such that the electrode tips assume the shapes shown in FIGS. 1 and 2 alternately.

In the case of the first electrode shape as shown in FIG. 1, a relatively thick first electrode tip 11 has built up at the free end of the electrode body 10, on which tip a relatively thin second electrode tip 12 has grown.

In the case of the second electrode shape as shown in FIG. 2, the thin second electrode tip 12 has melted down and its material has deposited to a large extent on the thick first electrode tip 11, so that now a single third electrode tip 11a has developed with a diameter larger than the diameter of the first electrode tip 11 in FIG. 1.

The alternating change between these two electrode shapes prevents multiple peak formation as well as a resultant arc jumping at least to a large extent, as it also limits or reduces electrode burnout during the life of the lamp and the related rise in the burning voltage.

Suitable frequencies of the lamp AC are preferably selected as operating parameters of the lamp by means of which these electrode forms are generated alternatingly and activated at appropriate intervals and periods.

Specifically for generating the relatively thin second electrode tip 12 as shown in FIG. 1, the lamp can be operated during a first operating phase on a lamp AC with a relatively high first frequency $f_1$ in the range between about 300 Hz and about 3000 Hz.

To avoid the above-described disadvantages of a continuous operation of the lamp at a high frequency $f_1$, the frequency of the lamp AC is switched over at definite intervals in a second operating phase (regeneration phase) to a relatively low second frequency $f_2$, so that the thin second electrode tip 12 melts down and its material deposits at least to a large extent on the thick first electrode tip 11. In this way, the thick third electrode tip 11a as shown in FIG. 2 is created exclusively, with a diameter generally somewhat larger than that of the first electrode tip 11 as shown FIG. 1.

The second frequency $f_2$ can be in the range between about 0 and about 300 Hz, preferably between about 20 and about 200 Hz, or between about 1/20 and about 1/2 the first frequency $f_1$. The first frequency $f_1$ can also be defined as an integral multiple of the second frequency $f_2$ ($f_1=n*f_2$).

Alternatively or additionally, in the second operating phase, a DC component whose duration is between about 0.1 and about 10 seconds can also be applied to the lamp. This DC component is preferably run with a first and then with the opposite second polarity.

If the electrode shape shown in FIG. 2 has been achieved at least to a large extent, then the first operating phase is changed over to again so that again a thin second electrode tip 12 is formed.

The second operating phase is activated preferably regularly after a duration of the first operating phase of between about 0.5 and about 10 hours has ended, depending on the type of lamp, where the second operating phase has preferably a duration of between about 0.1 and about 3600 seconds.

Differentiation is preferably made between the case where the lamp is used at least to a large extent in a continuous mode and the case where the lamp is switched on for relatively short durations at and then switched off again. In the former case, the operating period of the lamp is taken and after said period of the first operating phase, the second operating phase of the said duration is activated before the first operating phase is returned to. If the lamp, on the other hand, is operated only for relatively short periods, the second operating phase can always be activated in the form of a switch-on operating phase after switching on the lamp, before preferably only the first operating phase is then used.

The above-mentioned operating parameters are also especially set such that no multiple thin electrode tips can be formed during the first operating phase due to the limited lateral extension of the thicker third electrode tip 11a.

Figure 3:
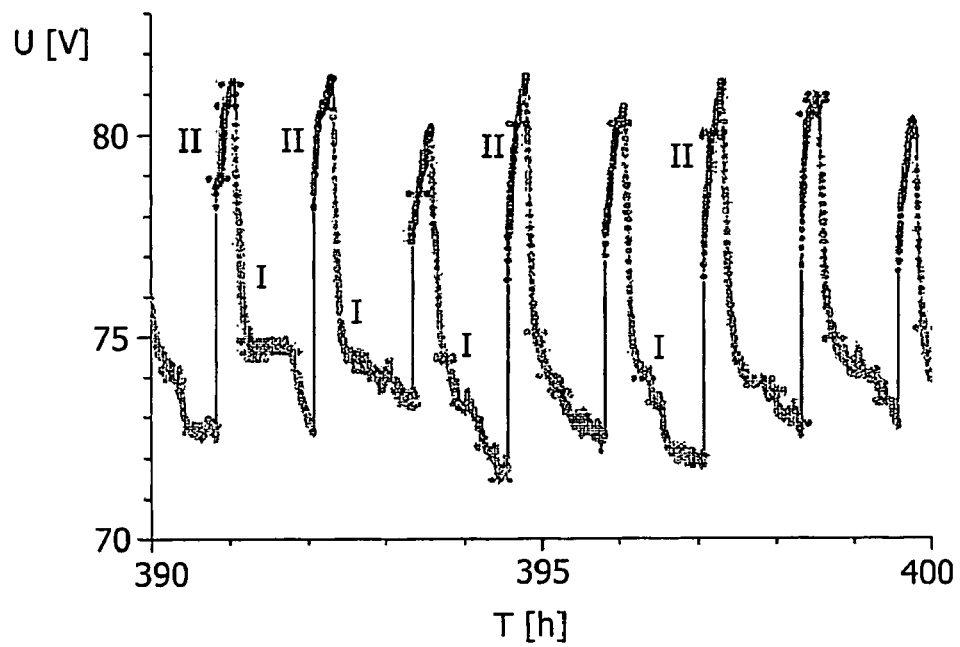
FIG. 3 shows a plotted pattern of the burning voltage of a lamp against time.

FIG. 3 shows the pattern of the burning voltage U in Voltss for a high intensity discharge lamp over time T in hours, where the higher first frequency $f_1$ of the lamp AC is around 500 Hz during the first operating phase marked as "I" and the lower second frequency $f_2$ during the second operating phase marked "II" at about 90 Hz.

It can be clearly recognized that the burning voltage U during the first operating phase I with duration of about one hour each, drops to a value of about 72 to 74 Volts starting from a value of about 80 to 81 Volts. The thin second electrode tips 12 formed as shown in FIG. 1 are melted due to the second operating phase II with a duration of about 15 minutes each activated on reaching this low burning voltage, and in this manner the thicker third electrode tips 11a are generated or regenerated as shown in FIG. 2 such that the burning voltage again climbs to a value of about 80 to 81 Volts.

Figure 4:
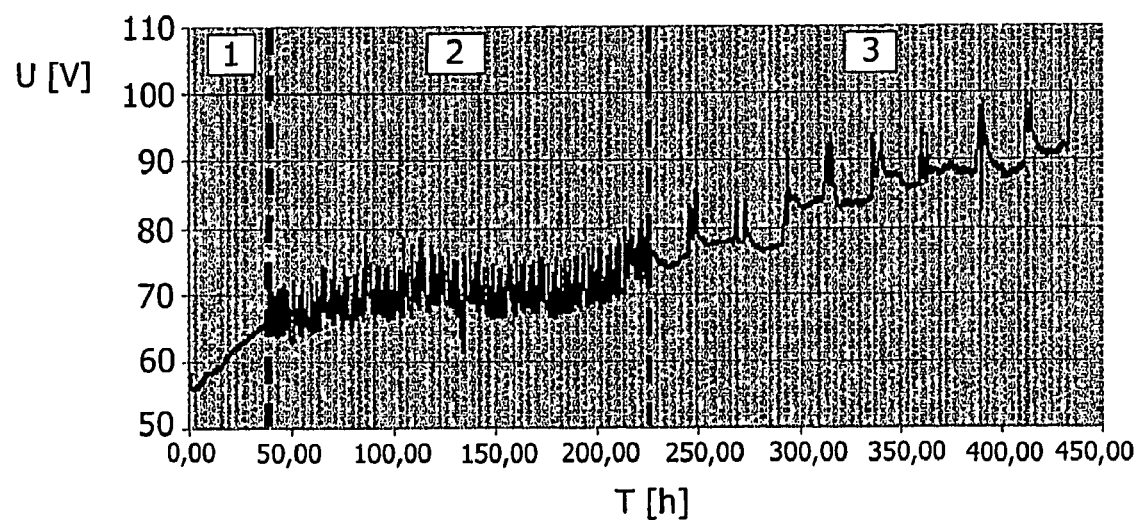
FIG. 4 shows a plotted pattern of the burning voltage of a lamp against time during various types of operation and FIG. 5 shows a basic circuit diagram of a circuit of a circuit arrangement for executing the method.

FIG. 4 shows a time-compressed representation of the pattern of the mean burning voltage of UHP lamps with a power of 150 Watt for three different modes of operation.

In the area marked "1" (first mode of operation) the lamp was operated exclusively at a high first frequency $f_1$ of the 500 Hz lamp AC corresponding to the above-described first operating phase. It can be easily recognized that, as mentioned above, the burning voltage rises overall due to the burnout of the electrodes after a relatively long operating period, here of about 40 working hours.

The pattern of the mean operating voltage U shown in area "2" was obtained for a second mode of operation, in which the said first operating phase alternated with a second operating phase. In the first operating phase, the lamp AC again had a first frequency $f_1$ of 500 Hz, while the second frequency $f_2$ was 90 Hz in the second operating phase. The second operating phase was activated about every two hours for about 90 seconds.

It is clearly noticeable that in this area "2" (second mode of operation) the rise of the burning voltage and thereby the burnout of the electrodes is considerably smaller. The jumps in the pattern of the burning voltage indicate the respective melting of the thin electrode tips 12 during the second operating phase.

Finally, the pattern of the mean burning voltage U is depicted in the area "3" for a third mode of operation, which corresponds to the second mode, with the exception that the second operating phase was activated only about every eleven hours.

It can be clearly noticed that the burning voltage U rises more sharply in the course of a relatively long operating period (here about 200 hours) due to the not-so-frequent regeneration phases (second operating phase with lower second frequency $f_2$) (and the electrodes burn back more heavily) than in the second mode (area "2"). However, this rise is still lower than in the case of the first mode (area "1"), in which no regeneration-took place and exclusively the high first frequency $f_1$ (first operating phase) of the lamp AC was activated.

Said long-term rise in the burning voltage can be further reduced, if the low second frequency $f_2$ of the lamp AC activated in the second operating phase is reduced in the course of the life of the lamp, for example from initially 90 Hz to 80 or 70 Hz.

The first-time generation of the relatively thick third electrode tip 11a (i.e. especially after switching-on the lamp for the first time after its manufacture) takes place preferably during a conditioning phase (in the factory etc.) in which the lamp is operated after switching on first at a relatively low conditioning frequency $f_K$ of the lamp AC in the range from, for example, about 20 to 200 Hz, preferably 90 Hz, for a period of time between about 0.1 and 10 minutes or even considerably longer if required. The high first frequency $f_1$ for the later first operating phase can then be defined preferably in dependence on the value of the conditioning frequency $f_K$ in the range between about $2*f_K$ and about $15*f_K$.

If required, a power pulse with the same polarity and a duration of about six percent of the period can be superimposed in the conditioning phase of each period of the lamp AC prior to a change of polarity, to improve the stability of the arc discharge during this conditioning phase.

Alternatively, it is also possible to generate the thick third electrode tip 11a in the course of the manufacture of the lamp by suitably molding the electrode material.

A preferred numerical example for the operation of a UHP lamp is given below. After switching on the lamp, it is first operated in a switch-on operating phase for about 0.1 to 10 minutes, preferably about 90 seconds with a third frequency $f_3$ of the lamp AC between about 20 and about 200 Hz, preferably about 100 Hz. This third frequency $f_3$ can also be mostly equal to the conditioning frequency $f_K$ or the second frequency $f_2$ during the second operating phase and serves to create the thick third electrode tip 11a.

Subsequently the first operating phase is activated, in which the lamp AC has a first frequency $f_1$ of about 500 Hz. After a predetermined period of time of, for example, about four hours, has elapsed, the second operating phase is activated for a period of about 90 seconds with a second frequency $f_2$ of about 100 Hz, before subsequently a switch-over to the first operating phase takes place.

Figure 5:
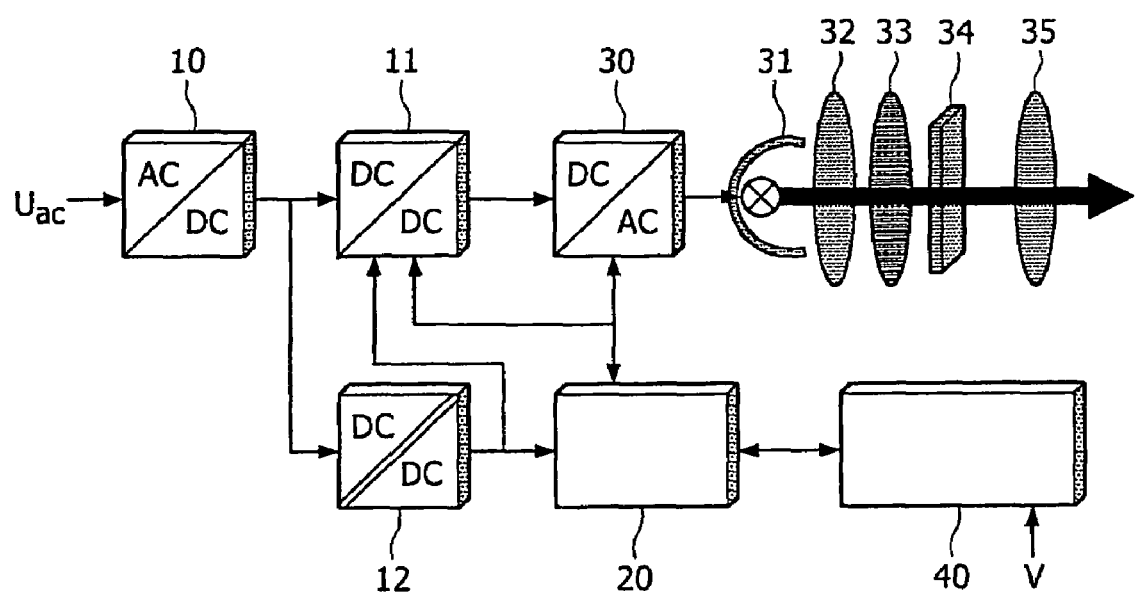

FIG. 5 finally shows a schematic block circuit diagram of an embodiment of a circuit arrangement for generating the lamp AC with the frequencies described above for a discharge lamp 31 from an AC voltage $U_{ac}$ present at the input of the circuit arrangement, of for example about 100 to 240 volts, as well as essential components of a projection system.

The circuit arrangement contains a rectifier stage 10, a power/current controller 11, a voltage converter 12, a control unit 20, a commutator with ignition stage 30 as well as an image processor 40, on which a signal V of the video/graphics to be represented is present for image generation.

The AC voltage $U_{ac}$ is converted into a DC voltage through the rectifier stage 10. From this DC voltage the power/current controller 11 generates a DC that has a current able for the discharge lamp 31 concerned by the power/current controller 11, which DC is superimposed as required with power pulses during a conditioning phase or the switch-on operating phase. For this purpose, the power/current controller 11 is accordingly controlled by the control unit 20.

The generated DC is converted into a predominantly rectangular lamp AC with a first or second frequency $f_1$, $f_2$ corresponding to the above-described alternatingly activated (first or second) operating phases after the conditioning phase or the switch-on operating phase by means of the commutator 30.

The voltage converter 12, which is fed rectifier stage 10 is used for voltage supply of the power/current controller 11.

The projection system is composed in essence the discharge lamp 31, an optical integrator 32, a color modulator 33, a display 34 as well as a lens system 35. The color modulator 33 and the display 34 are controlled in known manner by the image processor 40 in dependence on the video/graphics signal V present on it.

The control unit 20 and the image processor 40 are interlinked through a communication connection and synchronized and designed in such a manner that the generation of the power pulses takes place in the switch-on operating phase by the power/current controller 11 and the commutation of the DC by the commutator 30 takes place with the above-described frequencies $f_1$, $f_2$ in the first or second operating phase with the predefined time distances and durations.

As required, also the burning voltage of the lamp 31 can be monitored in a manner known per se in order to reduce the second frequency $f_2$, in case of a beginning rise in accordance with the invention, in accordance with the above explanation during the second operating phase against the initially defined value.

The control unit 20 and/or the image processor 40 are accordingly programmed to suit this purpose and provided with a memory in which the said operating parameters of the said operating phases are stored.

When using the discharge lamp in illumination units for projection systems, which react sensitively to light fluctuations during the lamp power period (such as for example DLP- and LCOS-systems), the following should preferably be observed in respect of the selection of the operating frequencies $f_1$ and $f_2$:

To avoid light fluctuations, artifacts or other image interference, the first and second frequencies $f_1$, $f_2$ in the first or second operating phase respectively should each be in a whole-number ratio to the image frequency.

In a similar manner, the third frequency $f_3$ of the switch-on operating phase can also be defined where its synchronization is, however, not so critical due to the generally short duration of the switch-on operating phase.

Finally, the circuit arrangement for execution of the method as invented preferably contains particularly the control unit 20, a microprocessor or microcontroller with a software program, by means of which the explained method steps can be executed or controlled.

The invention claimed is:

1. A method for operating a discharge lamp comprising the acts of:
   operating the discharge lamp during a first operating phase with a first signal having a first frequency; and operating the discharge lamp during a second operating phase with a second signal having a second frequency;

wherein the first frequency is selected such that a thin electrode tip is formed on an electrode body during the first operating phase, the tip being melted back by the second frequency, wherein the second operating phase is activated after a pre-defined period of the first operating phase has elapsed, and wherein the second frequency is between about 20 Hz and about 300 Hz.

2. The method as claimed in claim 1, wherein the first frequency is in a range between about 300 Hz and about 3000 Hz.

3. The method as claimed in claim 1, wherein the second frequency about 90 Hz.

4. The method as claimed in claim 1, wherein the first frequency is an integral multiple of the second frequency.

5. The method as claimed in claim 1, further comprising the act of reducing the second frequency in dependence on a rise in a burning voltage of the discharge lamp occurring during a life of the discharge lamp.

6. The method as claimed in claim 5, wherein the act reducing reduces the second frequency from initially 90 Hz to 80 or 70 Hz during the life of the discharge lamp.

7. The method as claimed in claim 1, wherein the act of operating the discharge lamp during the second operating phase is performed regularly after an operating period of the first operating phase of between about ½ hour and about ten hours.

8. The method as claimed in claim 1, wherein the act of operating the discharge lamp during the second operating phase is performed for a duration of between about 0.1 and about 3600 seconds.

9. The method as claimed in claim 1, wherein the act of operating the discharge lamp during the second operating phase comprises a switch-on operating phase after switching on of the discharge lamp.

10. The method as claimed in claim 9, wherein the switch-on operating phase is activated for a duration of between about 0.1 and about 10 minutes.

11. The method as claimed in claim 9, wherein the switch-on operating phase is activated for a duration of about 90 seconds.

12. A computer readable medium embodying a data processing program with program code when executed by a processor is configured to perform the method of claim 1.

13. The method as claimed in claim 1, wherein the first frequency is about 500 Hz.

14. The method as claimed in claim 1, further comprising the act of providing a direct current signal during the second operating phase for a duration between about 0.1 and about 10 seconds.

15. The method as claimed in claim 1, wherein the direct current signal is provided with a first polarity and then with a second polarity which is opposite to the first polarity.

16. The method as claimed in claim 1, wherein the act of operating the discharge lamp during the second operating phase is performed about every two hours for about 90 seconds.

17. A circuit arrangement for operating a discharge lamp comprising a controller configure to:

operate the discharge lamp during a first operating phase with a first signal having a first frequency; and operate the discharge lamp during a second operating phase with a second signal having a second frequency;

wherein the first frequency is selected such that a thin electrode tip is formed on an electrode body during the first operating phase, the tip being melted back by the second frequency, wherein the second operating phase is activated after a pre-defined period of the first operating phase has elapsed, and wherein the second frequency is between about 20 Hz and about 300 Hz.

18. An illumination unit with a high intensity discharge lamp and a circuit arrangement comprising a controller configure to:

operate the discharge lamp during a first operating phase with a first signal having a first frequency; and operate the discharge lamp during a second operating phase with a second signal having a second frequency;

wherein the first frequency is selected such that a thin electrode tip is formed on an electrode body during the first operating phase, the tip being melted back by the second frequency, wherein the second operating phase is activated after a pre-defined period of the first operating phase has elapsed, and wherein the second frequency is between about 20 Hz and about 300 Hz.

19. A projection system with a projection display and an illumination unit as claimed in claim 18.

* * * * *